Dec. 9, 1958   P. G. MARIÉ   2,864,061
MULTICHANNEL FILTER
Filed Dec. 10, 1954   5 Sheets-Sheet 1

INVENTOR
PIERRE G. MARIE
BY Wenderoth, Lind & Ponack
Attys.

Dec. 9, 1958    P. G. MARIÉ    2,864,061
MULTICHANNEL FILTER

Filed Dec. 10, 1954    5 Sheets-Sheet 2

INVENTOR
PIERRE G. MARIE
BY
Wenderoth, Lind & Ponack.
Attys.

Dec. 9, 1958  P. G. MARIÉ  2,864,061
MULTICHANNEL FILTER
Filed Dec. 10, 1954  5 Sheets-Sheet 3

INVENTOR
PIERRE G. MARIE
BY
Wenderoth, Lind + Ponack
Attys.

Dec. 9, 1958  P. G. MARIÉ  2,864,061
MULTICHANNEL FILTER

Filed Dec. 10, 1954  5 Sheets-Sheet 4

INVENTOR
PIERRE G. MARIE
BY
Wenderoth, Lind & Ponack
Attys.

Dec. 9, 1958   P. G. MARIÉ   2,864,061
MULTICHANNEL FILTER
Filed Dec. 10, 1954   5 Sheets-Sheet 5

INVENTOR
PIERRE G. MARIE
BY
Wenderoth, Lind & Ponack
Attys.

United States Patent Office 2,864,061
Patented Dec. 9, 1958

2,864,061

MULTICHANNEL FILTER

Pierre G. Marié, Paris, France

Application December 10, 1954, Serial No. 474,407

Claims priority, application France December 14, 1953

6 Claims. (Cl. 333—73)

The present invention relates to multichannel filters, more particularly to devices which, when receiving electromagnetic energy spread over a total large bandwidth of frequencies that is divided into a plurality of partial narrow bandwidths, convey the energies relating to the said partial bandwidths in different directions.

In the present specification, a partial bandwidth which is occupied by signals to be transmitted will be called a "channel" and the frequency bandwidths which are between two consecutive channels and are not occupied by any signal to be transmitted will be called "inter-channel bandwidths."

The object of the present invention is to construct an apparatus of the spectographic type which deflects selectivity a wave of a great bandwidth and which has a laminar structure in order that it should occupy the smallest possible volume for a given mean wavelength of the electro-magnetic energy to be deflected selectively.

Another object of the invention is to construct an apparatus which deflects selectively a wave of large bandwidth and which does not comprise any metallic part, in order that it may have the smallest possible weight for a given mean wavelength of the electro-magnetic energy to be deflected selectively.

According to the invention, the electromagnetic energy to be deflected is guided, in the form of a plane wave, in a plate of homogeneous dielectric material, and this plate has a variable thickness which is suitably fixed to give the dielectric substance a desired index of refraction. As a matter of fact, in a dielectric plate of variable thickness, the phase velocity of a guided wave and, consequently, the index of refraction are functions of the thickness of the plate.

A path in a laminar dielectric medium is offered to a plane wave of large bandwidth and the thickness of this path is made variable either at positions, which are localized in the form of prismatic or lenticular extra thicknesses in order to obtain localized selective deflecting or focussing effects, the propagation being rectilinear in the intervals between the extra thicknesses, or continuously and transversely of the direction of propagation, the latter then being curvilinear and its radius of curvature varying with the wavelength.

The invention will be better understood on reading the detailed description which will now be given and on examining the accompanying drawings, of which Fig. 1 represents a plate of dielectric substance with parallel faces, with reference to co-ordinate axes;

Figure 1:
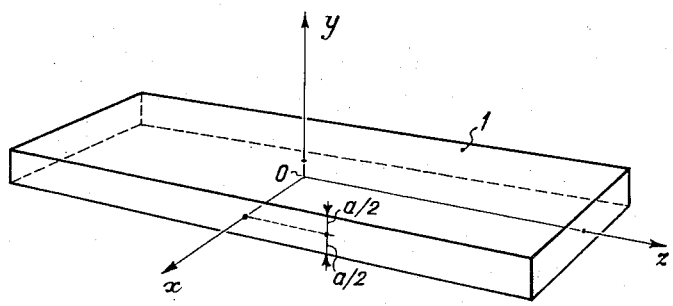

In Fig. 1, a plate 1 of dielectric substance, having a dielectic constant $\epsilon$, is referred to the axes $O\ x\ y\ z$ and is limited by the parallel planes $$y = \pm \frac{a}{2}$$

It is known that electromagnetic waves can be propagated in such a plate.

Outside the plate, the field then decreases exponentially in the form of an evanescent wave. The phase velocity of the waves which are propagated in the dielectric plate is a function of the ratio between the thickness of the plate and the wavelength in the dielectric substance.

More precisely, let $\epsilon$ be the dielectric constant of the plate;
$a$ the thickness of the plate;
$\lambda$ the wavelength in free space;
$\lambda_g$ the wavelength of the wave guided in the plate;
$c$ the velocity of light; and $$v = \frac{\lambda_g}{\lambda}$$

the phase velocity in the plate.

If the electric field of the wave is parallel to the plate, we have the relationship:

$$\tan\left[\frac{\pi a}{\lambda}\sqrt{\epsilon - \left(\frac{\lambda}{\lambda_g}\right)^2}\right] = \sqrt{\frac{\left(\frac{\lambda}{\lambda_g}\right)^2 - 1}{\epsilon - \left(\frac{\lambda}{\lambda_g}\right)^2}} \quad (1)$$

or $$\tan\left[\frac{\pi a}{c\lambda_g}\sqrt{\epsilon v^2 - c^2}\right] = \sqrt{\frac{c^2 - v^2}{\epsilon v^2 - c^2}} \quad (2)$$

and, if the electric field of the wave is perpendicular to the plate, we have the relationship:

$$\tan\left[\frac{\pi a}{\lambda}\sqrt{\epsilon - \left(\frac{\lambda}{\lambda_g}\right)^2}\right] = \epsilon\sqrt{\frac{\left(\frac{\lambda}{\lambda_g}\right)^2 - 1}{\epsilon - \left(\frac{\lambda}{\lambda_g}\right)^2}} \quad (3)$$

or $$\tan\left[\frac{\pi a}{c\lambda_g}\sqrt{\epsilon v^2 - c^2}\right] = \epsilon\sqrt{\frac{c^2 - v^2}{\epsilon v^2 - c^2}} \quad (4)$$

Formulae 2 and 4 show that the phase velocity $v$ approaches the velocity of light $c$ when the thickness of the dielectric plate $a$ approaches zero and that the same phase velocity approaches $$\frac{c}{\sqrt{\epsilon}}$$

the velocity of the wave in the unbounded substance, when the thickness $a$ increases.

Figure 2:
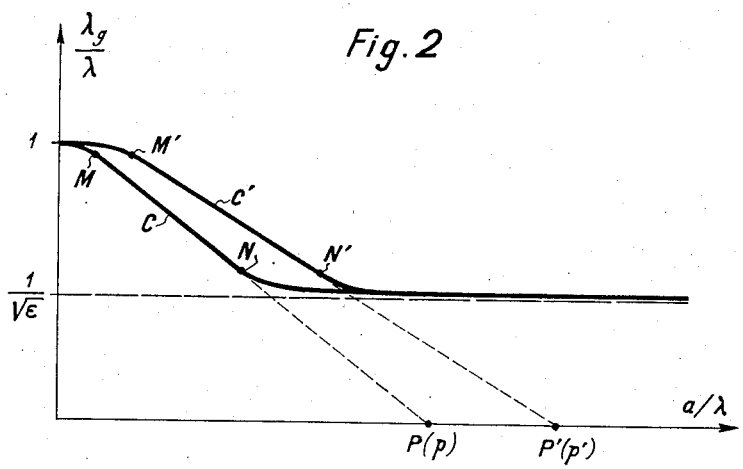
Fig. 2 represents curves which give the guided wavelength in a dielectric plate as a function of the thickness of the plate when the polarisation of the wave is in the plane of the plate and perpendicular to this plane respectively.

The curve C of Fig. 2 represents the values of $$\frac{\lambda_g}{\lambda}$$

as a function of those of $$\frac{a}{\lambda}$$

given by Equation 1 and the curve C′ represents the same values, still as a function of $$\frac{a}{\lambda}$$

given by Equation 3.

In the two cases, the electric field outside the plate decreases proportionately to $$e^{-\left|\frac{y}{\sigma}\right|}$$

with $$\frac{1}{\sigma}=\frac{2\pi}{\lambda}\sqrt{\left(\frac{\lambda}{\lambda g}\right)^2-1} \quad (5)$$

If the substance of the plate 1 is homogeneous, the variations in thickness of the plate play the part of variations of optical index since, by formulae 1 and 3, the guided wavelength $\lambda_g$ is connected with the thickness $a$ of the plate.

Figure 3:
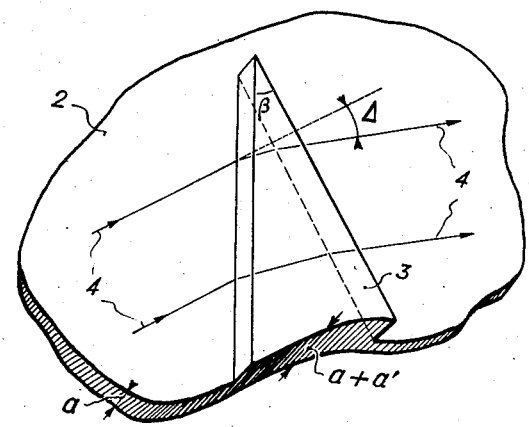
Fig. 3 shows an extra thickness in the form of an angle and having properties similar to those of a very dispersive prism.

Fig. 3 represents an undefined plate 2 of dielectric material with parallel faces and with a thickness $a$, the said plate comprising a projection 3, of the same material, confined within an angle of the value $\beta$, the said projection having a thickness $a'$ and, consequently, the plate 2 having a thickness $a+a'$ at the projection. The rays of a plane wave are represented by 4. In the part of the plate having a thickness $a$, the plane wave is propagated with a phase velocity corresponding to the wavelength $\lambda_g$ given by Equation 1 or by Equation 3 in accordance with the direction of polarisation. In the part of the plate with a thickness $a+a'$, the wave is propagated with a phase velocity $\lambda'_g$ given by Equation 1 or 3 in which $a$ is replaced by $a+a'$.

The angular projection deflects the wave guided by the plate 2 like a prism, the angle of deflection being given by $$\Delta=\left(\frac{\lambda'_g}{\lambda_g}-1\right)\beta \quad (6)$$

This angle of deflection varies with the frequency, since $$\frac{\lambda_g}{\lambda}$$

and $$\frac{\lambda'_g}{\lambda}$$

depend respectively on the ratios $$\frac{a}{\lambda}$$

and $$\frac{a+a'}{\lambda}$$

More precisely, we obtain, by logarithmic differentiation of Formula 6, $$\frac{p\Delta}{\Delta}=\frac{d\lambda g'}{\lambda g'}-\frac{d\lambda_g}{\lambda_g}$$

The logarithmic derivative $$\frac{d\lambda_g}{\lambda_g}$$

can be expressed as a function of the slope $$\frac{d\left(\frac{\lambda_g}{\lambda}\right)}{d\left(\frac{a}{\lambda}\right)}$$

of the curve C or C′ at the abscissa point $$\frac{a}{\lambda}$$

$$\frac{d\lambda_g}{\lambda_g}=\left[1-\frac{a}{\lambda_g}\frac{d\left(\frac{\lambda_g}{\lambda}\right)}{d\left(\frac{a}{\lambda}\right)}\right]\frac{d\lambda}{\lambda} \quad (7)$$

In the same way, the logarithmic derivative $$\frac{d\lambda_g'}{\lambda_g'}$$

can be expressed as a function of the slope $$\frac{d\left(\frac{\lambda_g'}{\lambda}\right)}{d\left(\frac{a+a'}{\lambda}\right)}$$

of the curve C or C′ at the abscissa point $$\frac{a+a'}{\lambda}$$

$$\frac{d\lambda_g'}{\lambda_g'}=\left[1-\frac{a+a'}{\lambda_g'}\frac{d\left(\frac{\lambda_g'}{\lambda}\right)}{d\left(\frac{a+a'}{\lambda}\right)}\right]\frac{d\lambda}{\lambda} \quad (8)$$

By substracting Equations 7 and 8 from each other, we obtain $$\frac{d\Delta}{\Delta}=\left[\frac{a}{\lambda_g}\frac{d\left(\frac{\lambda_g}{\lambda}\right)}{d\left(\frac{a}{\lambda}\right)}-\frac{a+a'}{\lambda_g'}\frac{d\left(\frac{\lambda_g'}{\lambda}\right)}{d\left(\frac{a+a'}{\lambda}\right)}\right]\frac{d\lambda}{\lambda} \quad (9)$$

Figure 4:
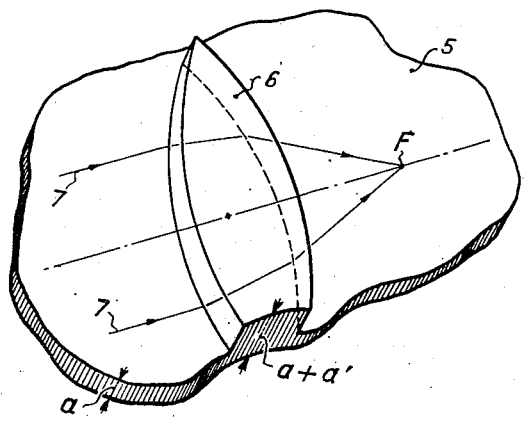
Fig. 4 shows an extra cylindrical thickness which is limited by two arcs of a circle and is called lenticular and has properties similar to those of a dispersive lens.

Fig. 4 represents an undefined plate 5 of dielectric material with parallel faces and having a thickness $a$, the said plate comprising a projection 6 of the same material, the said projection having the shape of a lens in section and a thickness $a'$ and, consequently, the plate 5 having a thickness $a+a'$ at the projection. The radii of the faces, which are perpendicular to the plate 4 and bound the lenticular projection 6, are $R_1$ and $R_2$.

The rays of a plane wave are represented by 7. The lenticular projection deflects the wave that is guided by the plate 4 like a lens having a focal length F which is given by the formula $$\frac{1}{F}=\left(\frac{1}{R_1}+\frac{1}{R_2}\right)\left(\frac{\lambda_g'}{\lambda_g}-1\right) \quad (10)$$

Figure 5:
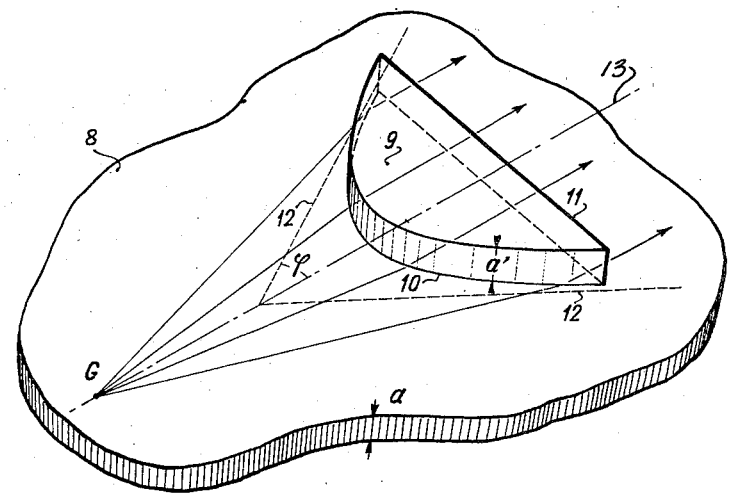
Fig. 5 shows an extra cylindrical thickness which is limited by a plane face and an hyperbolic face and has properties which are similar to those of a stigmatic lens.

Fig. 5 represents an undefined plate 8 of dielectric material with parallel faces and having a thickness $a$, the said plate comprising a projection 9 of the same material which is bounded by an hyperbola 10 and a straight line 11, the said projection having a thickness $a'$ and, consequently, the plate 8 having a thickness $a+a'$ at the projection.

If the asymptotes 12 of the hyperbola make, with the optic axis 13, and angle $\varphi$ which is given by the formula $$\cos\varphi=\frac{\lambda_g'}{\lambda_g}$$

the lenticular projection 9 accurately converts a spherical wave coming from G (G being one of the foci of the hyperbola) into a plane wave leaving the flat face.

Figure 6:
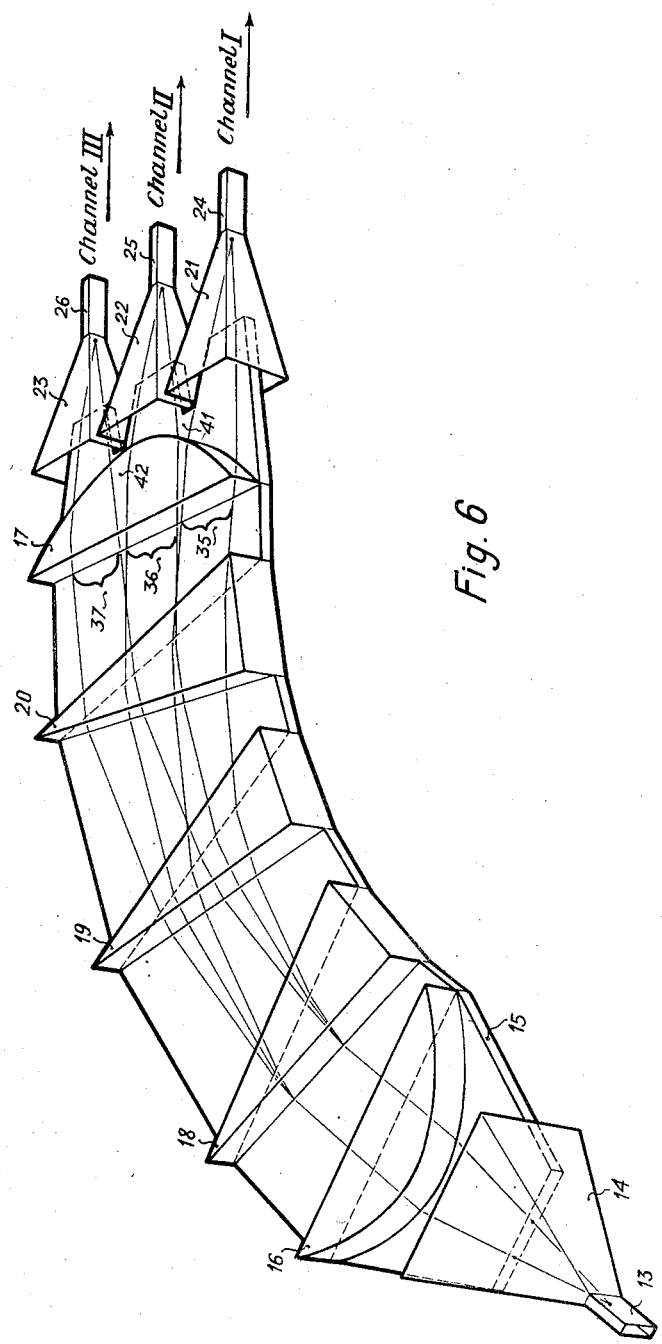
Fig. 6 shows a set of extra thicknesses, some in the form of an angle and the others in the form of lenses, the whole having properties similar to those of a spectrograph.

Fig. 6 represents a dielectric laminar spectrograph constituted by prisms of the type shown in Fig. 3 and by lenses of the type shown in Fig. 4 or of the type shown in Fig. 5.

A rectangular guide 13 leads a wave of large bandwidth to the horn 14. This horn is coupled with a dielectric plate 15 having a constant thickness $a$. The plate 15 extends into the horn in the plane of symmetry of the latter and is parallel to the electric field of the arriving electromagnetic wave. On the plate 15 there are two lenticular projections 16 and 17 and three angular projections 18, 19 and 20.

The lenticular projection 16 plays the part of a collimator, its focus (F in Fig. 4 and G in Fig. 5) coinciding with the tip of the horn. It converts the spherical wave radiated by this horn into a plane wave, the electric field of which is in the plane of the plate 15.

The angular projections 18, 19 and 20 play the part of prisms and deflect the plane wave of large bandwidth which is guided by the plate 15, the deflection varying with the refrequency.

The lenticular projection 17 plays the part of a focussing lens and it focusses the different partial waves (three in number, for example), contained in the wave of large bandwidth, in the horns 21, 22 and 23, in accordance with the deflection which they have undergone in passing through the prisms, i. e., in accordance with the frequency band over which they are spread. The energies pertaining to the channels I, II and III are directed towards the utilizing members by the guides 24, 25 and 26 respectively.

Figure 7:
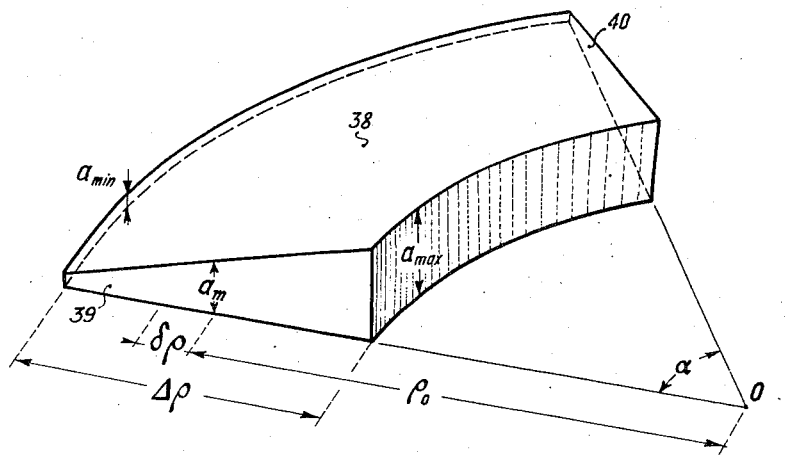
Figs. 7 and 8 show a plate of dielectric in the form of a crown segment of variable thickness, in which the waves are propogated in circles, the radius of which varies with the wavelength.
Figure 8:
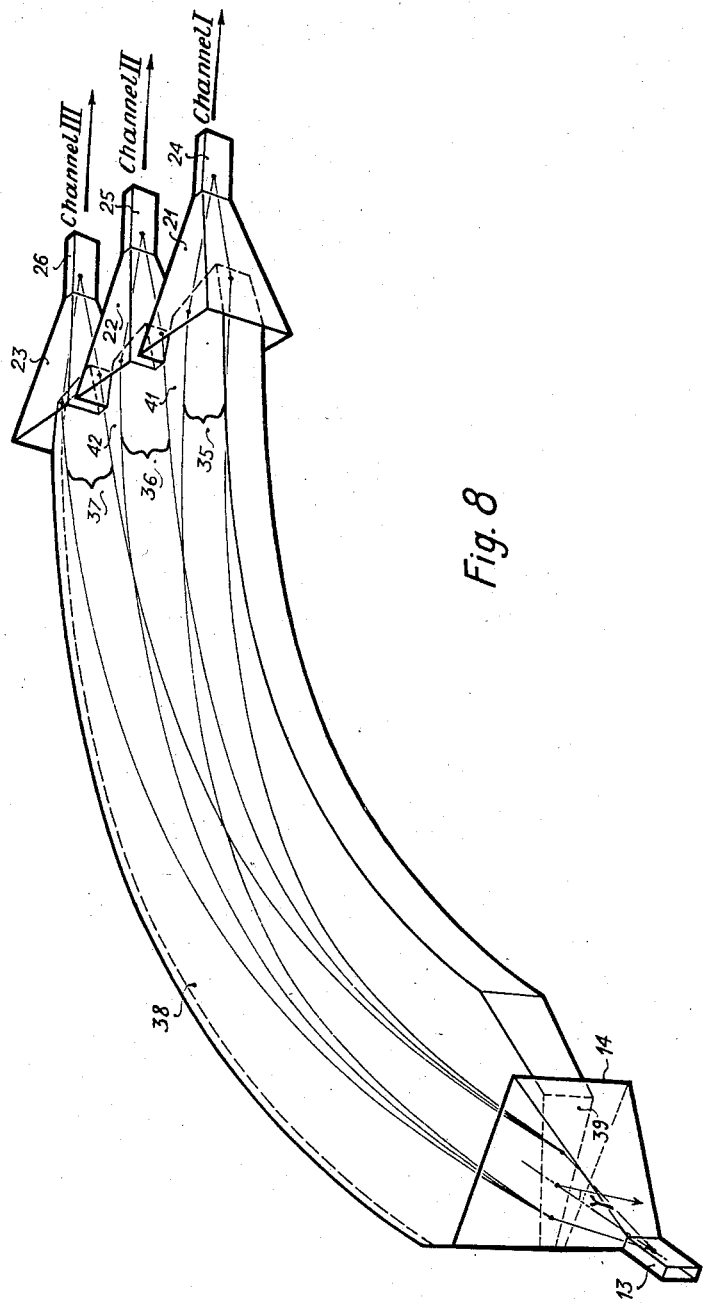

Although, in the spectrograph shown in Fig. 6, the electromagnetic rays are focussed and deflected at localised points, they assume, if the number of small triangular projections is sufficient, an approximately circular shape, the radius of curvature of which varies with the wavelength. The beams of rays 35, 36 and 37 relate to the channels I, II and III respectively. The intervals 41 and 42 between the beams correspond to the inter-channel bandwidths. Instead of producing the deflection discontinuously with the aid of triangular projections of constant thickness, a continuous deflection may be produced by decreasing the thickness of the dielectric perpendicularly to the direction of propagation. Thus, in the two cases, the curved electromagnetic rays pass through less dielectric substance the greater the distance of their trajectory from the centre of curvature. As a matter of fact, according to Fermat's principle, the optical trajectory for a given wavelength should remain the same for all the rays. The new apparatus is represented by Figs. 7 and 8.

Let (Fig. 7) $a_{min}$ be the minimum thickness of the dielectric 38, which is in the form of a crown segment; on the convex side; $a_{max}$ the maximum thickness of the same plate on the concave side; $\Delta a = a_{max} - a_{min}$, the change in the thickness of the plate;

$$a_m = \frac{a_{max} + a_{min}}{2}$$

the mean thickness of the plate at a circle having a mean radius $\rho_0$:

$\rho_0$ the mean radius of the dielectric crown;
$\delta\rho$ the radial distance of a point of the crown at the mean radius;
$\Delta\rho$ the difference between the extreme radii of the crown;
$\rho_0'$ the radius of curvature of the mean ray of the electromagnetic wave guided in the crown, for a wavelength $\lambda$.

For the mean wavelength $\lambda_m$, $\rho_0'$ takes the value $\rho_0$.

$p$ the abscissa of the point P where the rectilinear part MN of the curve C cuts the axis of the abscissae in Fig. 2.
$s$ the slope of this rectilinear part;
$p'$ the abscissa of the point P' where the rectilinear part M'N' of the curve C' cuts the axis of the abscissae in Fig. 2 and $s'$ the slope of this rectilinear part.

A plane wave is applied to the entry side of the plate 38.

In order that the rays of this wave should curve in circles having a centre O, it is necessary that the guided wavelength should be proportional to the radius of the circles described by the rays of the wave; this is represented by $$\lambda_g = k(\rho_0 + \delta\rho) \quad (11)$$

in which $k$ is contant and $\delta\rho$ varies from $$-\frac{\Delta\rho}{2} \text{ to} +\frac{\Delta\rho}{2}$$

In order that the thickness $a$ of the plate should be a linear function of $\delta\rho$ $$a = a_m - \frac{\Delta a}{\Delta\rho}\delta\rho \quad (12)$$

it is necessary, in view of the relationship (11), that $\lambda_g$ should be a linear function of $a$, or, in other words, it is necessary to use the curves C and C' of Fig. 2 in their linear part MN or M'N' according to whether the electric field of the guided wave is in the plane of the plate 38 or perpendicular to this plate. It will first be supposed that the electric field is in the plane of the plate.

On the segment MN, Formula 1 is equivalent to $$\frac{\lambda_g}{\lambda} = s\left(p - \frac{a}{\lambda}\right) \quad (13)$$

On putting the value of $a$, given by Formula 12, into Formula 13, the following equation is obtained:

$$\lambda_g = \frac{s\Delta a}{\Delta\rho}(\rho_0' + \delta\rho) \quad (14)$$

wherein:

$$\rho_0' = \frac{\Delta\rho}{\Delta a}(p\lambda - a_m) \quad (15)$$

If Formula 14 is compared with Formula 11, it is seen that $\rho_0'$ is the radius of the curvature of the electromagnetic rays of a wavelength $\lambda$.

Formula 15 gives the value of $\rho_0$ if $\lambda$ is made equal to $\lambda_m$:

$$\rho_0 = \frac{\Delta\rho}{\Delta a}(p\lambda_m - a_m) \quad (16)$$

When a plane wave is sent into the crown so that the face 39 is a wave surface at the entrance, the face 40 will be a wave surface at the outlet if the wave has a wavelength equal to $\lambda_m$. The direction of propagation will then be deflected through the angle $\alpha$ of the opening of the crown 38.

If the wavelength varies by $d\lambda$, the distance travelled in the dielectric remaining substantially the same, the relative variation of the angle of deflection will, except for sign, be equal to the relative variation of the radius of curvature; this is written as follows, regard being had to Formula 15:

$$\frac{d\alpha}{\alpha} = \frac{d\rho_0'}{\rho_0'} = \frac{1}{1 - \frac{a_m}{p\lambda_m}} \cdot \frac{d\lambda}{\lambda_m} \quad (17)$$

The width of the wave front being $\Delta\rho$, two waves can be separated in the space only if $$d\alpha \geq \frac{2\lambda}{\Delta\rho} \quad (18)$$

On putting this condition into Formula 17, the maximum separating power of the instrument $$\frac{\lambda}{d\lambda} = \frac{\alpha\Delta\rho}{2\lambda\left(1 - \frac{a_m}{p\lambda_m}\right)} \quad (19)$$

is obtained.

If the electric field of the wave guided by the crown had been perpendicular to the plane of the crown instead of being parallel thereto, it would be sufficient to replace $s$ by $s'$ in Formulae 13 and 14 and $p$ by $p'$ in Formulae 13, 15, 17 and 19.

The crown 38 is coupled (Fig. 8) with the horn 14, into which it extends along the plane of symmetry which is parallel or perpendicular to the electric field according to the direction of polarisation desired for the wave guided in the crown. It is, in the same way, coupled with the horns 21 to 23 into which it extends in the same manner. The reference numerals 13 and 24 to 26 denote the same parts as in Fig. 6.

As the horn 14 transmits a spherical wave, it is necessary to convert the latter into a laminar plane wave, as is obtained in the case of Fig. 6 by means of the lenticular projection 16. The focussing effect can be obtained more simply by giving the normal to the face 39 of the crown 38 a certain inclination to the axis of the horn 14. Let $\gamma$ be the angle between the said normal and the said axis. It is shown, by calculation, that this inclination is equivalent to a focussing by means of a lens having a focal length $f$, such that $$\frac{1}{f}=\frac{s\gamma\Delta a}{\lambda_{gm}\Delta\rho}\left[1-\left(\frac{s\Delta a}{\lambda_{gm}}\right)^2\right] \quad (20)$$

in which $\lambda_{gm}$ denotes the wavelength guided on the mean circle having the radius $\rho_0$ ($\lambda_{gm}$ is given by Formula 1 by making $a=a_m$).

While the invention has been described hereinabove in terms of preferred embodiments, various changes and modifications may be made therein without departing from the scope of the invention itself, which is set forth in the accompanying claims. Particularly, the antennae shown as electromagnetic horns may be of any directional type such as, for example, open wave-guide mouths.

What I claim is:

1. A multichannel filter for spreading in different directions partial bandwidth outgoing wavelets contained in a total large bandwidth incoming wave comprising in combination a dielectric plate the shape of a crown segment of arcuate configuration having radial, parallel and curved sides, means for spreading in different direction said large band width incoming wave into a plurality of said partial bandwidth outgoing wavelets, said means consisting of dielectric projecting portions on one of said parallel sides and integral with said plate, a directional transmitting antenna radiating said large bandwidth incoming wave, input coupling means between said antenna and one radial side of said plate, a plurality of directional receiving antennae each fed by an outgoing wavelet, and output coupling means between said antennae and the other radial side of said plate.

2. A multichannel filter for spreading, in different directions, partial-bandwidth outgoing wavelets contained in a total large-bandwidth incoming wave, comprising in combination a dielectric plate in the shape of a crown segment of arcuate configuration having radial, parallel and curved sides, means for spreading in different directions said large bandwidth incoming wave into a plurality of said partial bandwidth outgoing wavelets, said means consisting of dielectric projecting portions on one of said parallel sides and integral with said plate, a transmitting electromagnetic horn radiating said large-bandwidth incoming wave, a portion of said dielectric plate located at one radial side, extending into a plane of symmetry of said transmitting horn for coupling therebetween, a plurality of receiving electromagnetic horns each fed by an outgoing wavelet, and portions of said dielectric plate located at the other radial side of the plate, extending into the planes of symmetry of said receiving horns for coupling therebetween.

3. A multichannel filter according to claim 2 in which the portions of the dielectric plate for the coupling between said plate and the transmitting and receiving electromagnetic horns extend into the plane of symmetry of the horns parallel to the electric field of said horn patterns.

4. A multichannel filter according to claim 2 in which the portions of the dielectric plate for the coupling between said plate and the transmitting and receiving electromagnetic horns extend into the plate of symmetry of the horns perpendicular to the electric field of said horn patterns.

5. A multichannel filter for spreading, in different directions, a partial-bandwidth outgoing wavelets contained in a total large-bandwidth incoming wave, comprising in combination a dielectric plate in the shape of a crown segment of arcuate configuration having radial, parallel and curved sides, means for spreading in different directions said large bandwidth incoming wave into a plurality of said partial bandwidth outgoing wavelets, said means consisting of dielectric parallel wall prismatic and lenticular portions on and integral with said plate parallel to said plate, said prismatic portions spreading said large-bandwidth incoming wave in different directions forming partial bandwidth outgoing wavelets, said lenticular portions being located at the input to serve as a collimator and at the output to focus said partial bandwidth wavelets, a directional transmitting antenna radiating said large-bandwidth incoming wave, input coupling means between said antenna and one radial side of said plate, a plurality of directional receiving antennae each fed by an outgoing wavelet, and output coupling means between said antennae and the other radial side of said plate.

6. A multichannel filter for spreading, in different directions, partial-bandwidth outgoing wavelets contained in a total large-bandwidth incoming wave, comprising in combination a dielectric plate in the shape of a crown segment of arcuate configuration having radial and concave and convex curved sides, a wedge-shaped in radial cross-section and having a thickness linearly decreasing from its concave side to its convex side, a directional transmitting antenna radiating said large-bandwidth incoming wave, input coupling means between said antenna and one radial side of said plate, a plurality of directional receiving antennae each fed by an outgoing wavelet, and output coupling means between said antennae and the other radial side of said plate.

References Cited in the file of this patent

UNITED STATES PATENTS

| | | |
|---|---|---|
| 548,701 | Crehore | Oct. 29, 1895 |
| 2,129,712 | Southworth | Sept. 13, 1938 |
| 2,526,509 | Shawhan | Oct. 17, 1950 |
| 2,663,848 | Lewis | Dec. 22, 1953 |

FOREIGN PATENTS

| | | |
|---|---|---|
| 531,565 | Great Britain | Jan. 7, 1941 |